UNITED STATES PATENT OFFICE.

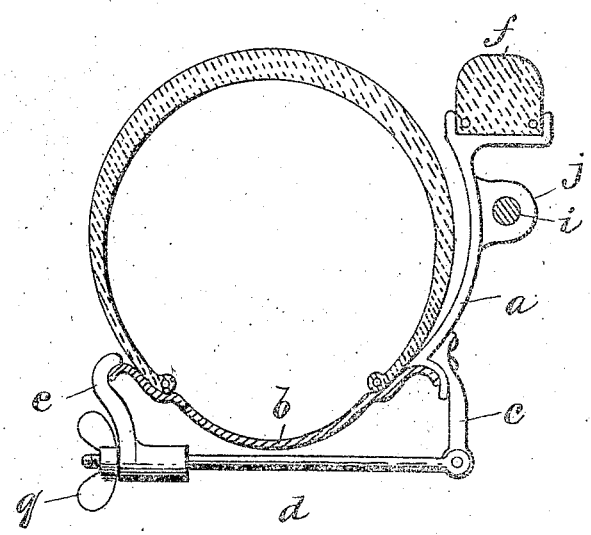
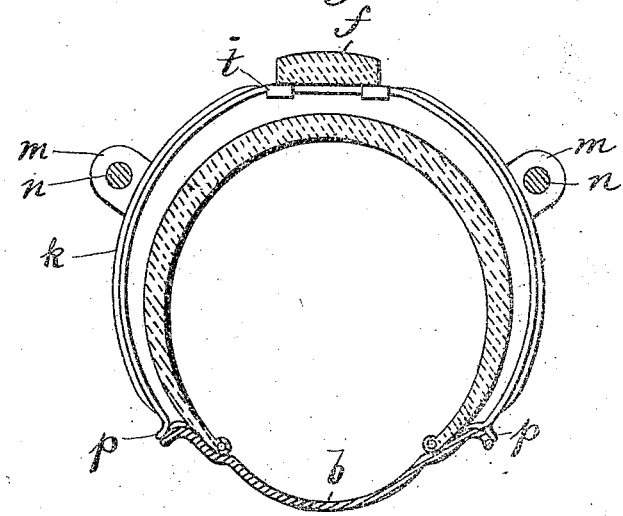

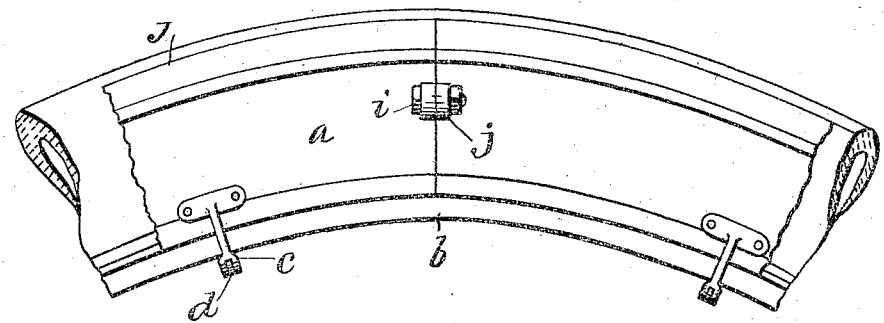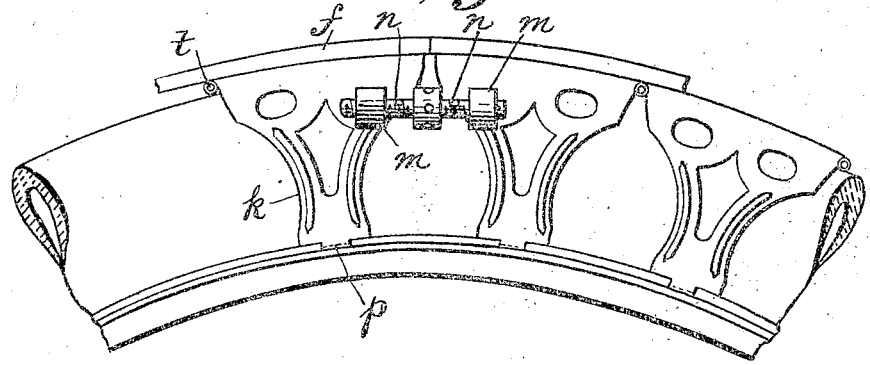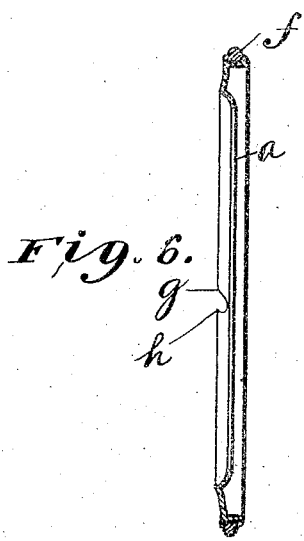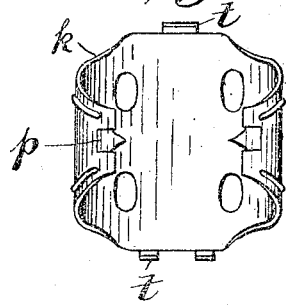

PERRY ERNEST DOOLITTLE, OF TORONTO, ONTARIO, CANADA.

VEHICLE-TIRE.

No. 879,610.      Specification of Letters Patent.      Patented Feb. 18, 1908.

Application filed May 17, 1904. Serial No. 208,368.

*To all whom it may concern:*

Be it known that I, PERRY ERNEST DOOLITTLE, subject of the King of Great Britain, residing at Toronto, in the county of York, Province of Ontario, Dominion of Canada, have invented new and useful Improvements in Vehicle-Tires, of which the following is a specification.

In motor and other vehicles equipped with collapsible tires, it not infrequently happens that a puncture or burst of the tire occurs when the vehicle is in use, and it is with considerable difficulty that the tire can be removed, repaired, and replaced. When the accident occurs at a short distance only from a suitable place for making repairs, or during the night or in stormy weather, it would be much more convenient and satisfactory to the driver to be enabled to continue his journey to the repairing place before undertaking the repair, but from the very nature of the rubber and fabric of a pneumatic tire, to drive the vehicle any considerable distance with the tire so deflated, would usually result in serious damage to the deflated tire or even in the complete destruction thereof. Now by means of my invention the driver can with very slight delay, continue his journey till a convenient time or occasion for repair occurs, without any fear of doing any injury to the collapsed tire. Furthermore, when the roads are slippery or greasy ordinary pneumatic tires do not give sufficient grip to propel a vehicle with safety; but by securing an appliance or appliances constructed according to this invention to one or both of the driving wheels, or to all four wheels, even under such conditions a firm grip of the road may be obtained and side slip obviated.

With these objects in view my invention consists of a supplemental tread of substantially the same diameter as the inflated tire so constructed that it may be quickly connected to the rim of a wheel to take all or nearly all of the load on the wheel hubs as hereinafter described and illustrated in the accompanying drawings in which:

Figure 1 is a cross section of a tire constructed in accordance with my invention. Fig. 2 a similar view of a modification. Fig. 3 a side elevation on a smaller scale of part of a tire provided with the arrangement shown in Fig. 1; Fig. 4 a similar view of part of a tire provided with the arrangement shown in Fig. 2, and Fig. 5 a detail of one of the joints of the parts shown in Figs. 2 and 4, and Fig. 6 is a plan view on a smaller scale of half the supplemental rim shown in Figs. 1 and 3.

Referring to Figs. 1 and 3 an appliance constructed according to this invention comprises a supplemental rim or felly —a— which may be rolled out of sheet steel for lightness, but may be made of wood or any other suitable material, and which is so shaped that when it is applied to an edge of the rim or felly —b— to which a pneumatic tire is attached, it will securely engage with the rim or felly so as to prevent any vertical movement of the supplemental rim or felly on the wheel. Suitable means are provided whereby the supplemental rim or felly is so clamped to the opposite edge of the fixed rim —b— or to spokes or to other fixed parts of the wheel that it cannot become displaced laterally but is, to all intents and purposes, an absolutely integral part of the wheel. I show inwardly extending arms —c— secured to the interior edge of the supplemental rim. To each of these arms is pivoted a bolt —d—. A clamp —e— shaped to engage the opposite rim is sleeved on each bolt and a thumb nut —g— is screwed on the end of the bolt whereby the parts may be tightened up as shown in Fig. 1. The supplemental rim or felly is provided with a suitable road-contact tread surface —f—, such as a narrow hard rubber band, which is preferably such as will prevent skidding on greasy roads and may be arranged to project almost as far from the axis of the wheel as the collapsible tire itself when finally inflated.

The supplemental rim or felly may be in the form of an unbroken ring and in that case it may be provided at one part with a notch —g— such that the supplementary rim or felly can be put on without lifting the vehicle by simply placing it alongside the wheel, inserting the edge of the wheel rim into the notch, the notch being preferably provided with a guiding projection —h—, to facilitate the insertion, holding the supplemental rim or felly in position and pushing the vehicle forward so as to cause the edge of the wheel rim to rise through the notch past the projection into place.

For greater convenience in carrying, the supplemental rim or felly may be made in any convenient number of sections adapted to be easily and quickly joined together and provided with suitable means, each as a screw threaded bolt and nut or screw threaded bolts and nuts —i—, passing through lugs —j— secured to the sections (see Fig. 3), whereby when the supplemental rim or felly is in its place on the wheel, its joints can be tightened up so as very securely to grip the wheel rim or felly circumferentially, the sections being held transversely to the rim by suitable means as hereinbefore described. When putting on a sectional supplemental rim or felly the parts of the wheel away from the ground have the sections applied to them first, then the vehicle is pushed forward upon the attached portion of the supplemental rim or felly, and finally the remaining sections are put into place and the whole tightened.

According to another construction shown in Figs. 2 & 4 an appliance for the purposes stated is composed of connected sections —k— each of which is bridge shaped and adapted to extend over the wholly or partly inflated tire and fit upon or engage the two edges of the fixed rim or felly so that when the appliance is put into position on the rim or felly and is tightened up thereon by the means with which it is provided, the appliance will be rigidly secured upon the wheel so as to serve as a tire therefor. The sections are preferably stamped with ribs to give increased strength. The edges of the sections may have fingers p formed thereon bent alternately in opposite directions to fit on the edge of the rim as shown. Each two adjacent sections of the belt, except the end ones, may be connected together by interlocking hook-like end portions, or by regular hinges —t— as shown. The end sections are provided with the lugs —m— threaded to receive the right and left hand threaded screw —n—. By turning this screw the belt of sections may be clamped on the fixed rim as described. The belt is or may be provided with a suitable tread —j—, as of rubber, which is preferably such as to give a good grip even on greasy roads and which may be secured to each of the sections so as, in conjunction with their other connections, to prevent them from coming apart when the appliance is not in use.

The rubber tread may be continuous except for a division at the point where the end sections are connected by the screw —n—. Thus the ends of the belt may be completely disconnected and the latter, when it is to be applied to a wheel, spread out with the edges of the sections uppermost, thus forming a trough into which the wheel can be rolled. The belt is thus easily rolled around the tire and may be secured in place by the means provided. When not in use the belt may be rolled up in a comparatively small bundle and is thus easily stowed.

It will be seen that in all the forms described I secure a solid supplemental tread which will take all or nearly all the load on the wheel according to circumstances.

By the expression "vehicle wheel of reducible diameter" employed in one or more of the claims, it is intended to cover an ordinary vehicle-wheel having a resilient tire, such as a pneumatic or other removable tire in which an injury to the tire will change or reduce its working diameter.

What I claim is:

1. In combination with a vehicle wheel carrying a collapsible tire, of an auxiliary wheel rim carrying a tire and detachably secured in a lateral position upon the vehicle wheel.

2. In combination with a vehicle wheel of reducible diameter, of an auxiliary wheel rim provided with means for detachably securing it in a lateral position upon the vehicle wheel.

3. In combination with a wheel and a pneumatic tire, a supplemental tire, a support for said supplemental tire extending radially outward and carrying the supplemental tire alongside of and substantially level with the main pneumatic tire, and means to detachably secure said support to the wheel.

4. In combination with a wheel and a pneumatic tire, a supplemental hard tread tire, a support for said supplemental tire extending radially outward and carrying the supplemental tire alongside of the main tire and substantially even with the normal bearing surface of the main tire, and means to detachably secure said support to the wheel.

5. In combination with a pneumatic tire, a rim therefor, a supplemental rim, a hard tread part carried by said supplemental rim, means to secure the supplemental rim to the main rim independently of the pneumatic tire, whereby a supplemental bearing is provided.

6. In combination with a pneumatic tire and a rim therefor, a supplemental rim divided into sections and having means to secure the ends of the sections together, means to detachably secure said supplemental rim to the main rim and a hard tread portion carried by said supplemental rim and held outwardly substantially even with the tread portion of the pneumatic tire.

7. In combination with a pneumatic tire and a rim therefor, a supplemental rim carrying a hard surfaced tread portion adapted to receive the bearing pressure of the tire, said supplemental rim consisting of a contractible divided band, means to draw the ends of the bands towards each other whereby the band may be tightened upon the wheel rim.

8. In combination with a pneumatic tire and a wheel rim therefor, a supplemental rim detachably secured directly to said wheel rim on one side thereof and extending radially outward and a hard tread member carried by said supplemental rim.

9. In combination with a tire of reducible diameter and a rim therefor, an auxiliary rim adapted to carry a tire, and clamps mounted on said auxiliary rim and adapted to engage directly with the rim of the main wheel.

10. In combination with a vehicle wheel of reducible diameter, an auxiliary rim adapted to carry a tire, fixed clamps carried by said auxiliary rim and adapted to engage the rim of the main wheel, and adjustable screw clamps also carried by the auxiliary rim and adapted to engage said main rim.

11. In combination with a vehicle wheel of reducible diameter and its rim, an auxiliary rim having fixed thereto hook-shaped clamps adapted to take over the upturned edges of the vehicle rim, and means to lock said clamps in place.

12. In combination with a vehicle wheel of reducible diameter, a spokeless auxiliary tire-carrying rim adapted to be mounted directly on and supported by the main wheel rim and adjustable hook-shaped clamps carried by the auxiliary rim and adapted to engage the main rim and means to detachably secure said clamps in place.

13. In combination with a vehicle wheel of reducible diameter and a rim therefor, an auxiliary rim adapted to carry a tire and having mounted thereon fixed hooks adapted to take over the edge of the main wheel rim and carrying adjustable hooked clamps also adapted to take over the edge of the wheel rim.

14. In combination with a vehicle wheel of reducible diameter and a rim therefor, an auxiliary rim adapted to carry a tire and having a fixed hook-shaped clamp adapted to engage one edge of the main wheel rim, an adjustable hook clamp adapted to engage the opposite edge of the main wheel rim, a screw rod on which said adjustable clamp is mounted and a nut adapted to bear against said adjustable clamp.

In testimony whereof I have signed my name to this specification in the presence of two subscribing witnesses.

PERRY ERNEST DOOLITTLE.

Witnesses:
MARGARET A. GLEESON,
JAS. P. MACGREGOR.